(12) United States Patent
Viswanathan et al.

(10) Patent No.: US 11,726,748 B2
(45) Date of Patent: Aug. 15, 2023

(54) DEVELOPING A SOFTWARE PRODUCT IN A NO-CODE DEVELOPMENT PLATFORM TO ADDRESS A PROBLEM RELATED TO A BUSINESS DOMAIN

(71) Applicant: The Boeing Company, Chicago, IL (US)

(72) Inventors: Kamakshi Viswanathan, San Diego, CA (US); Paul J. Extance, San Diego, CA (US)

(73) Assignee: THE BOEING COMPANY, Arlington, VA (US)

( * ) Notice: Subject to any disclaimer, the term of this patent is extended or adjusted under 35 U.S.C. 154(b) by 126 days.

(21) Appl. No.: 17/448,634

(22) Filed: Sep. 23, 2021

(65) Prior Publication Data
US 2023/0087993 A1    Mar. 23, 2023

(51) Int. Cl.
*G06F 8/20*     (2018.01)
*G06F 8/60*     (2018.01)
*G06F 40/47*    (2020.01)
*G06N 20/00*    (2019.01)

(52) U.S. Cl.
CPC .............. *G06F 8/20* (2013.01); *G06F 8/60* (2013.01); *G06F 40/47* (2020.01); *G06N 20/00* (2019.01)

(58) Field of Classification Search
CPC .. G06F 8/20; G06F 8/60; G06F 40/47; G06N 20/00
See application file for complete search history.

(56) References Cited

U.S. PATENT DOCUMENTS

| | | | |
|---|---|---|---|
| 11,330,070 B1* | 5/2022 | Nair | H04L 67/561 |
| 2018/0330017 A1* | 11/2018 | Kelly | G06F 16/9038 |
| 2023/0014590 A1* | 1/2023 | Casaregola | G06F 3/0486 |

FOREIGN PATENT DOCUMENTS

WO    WO-2022259005 A1 * 12/2022

OTHER PUBLICATIONS

Shouhong et al. "A Teaching Module of No-Code Business App Development", [Online], pp. 1-10, [Retrieved fromInterent on Mar. 23, 2023], <http://jise.org/Volume32/n1/JISE2021v32n1pp1-8.pdf>, (Year: 2021).*

* cited by examiner

*Primary Examiner* — Ziaul A Chowdhury
(74) *Attorney, Agent, or Firm* — Alleman Hall Creasman & Tuttle LLP

(57) ABSTRACT

A method is provided for developing a software product in a no-code development platform (NCDP) to address a problem related to a business domain. The method includes designing the software product in the NCDP. This includes receiving design instructions composed in a semi-structured grammar of a domain-driven design (DDD) natural language for the business domain, and generating a metamodel from the design instructions and according to the DDD natural language. The metamodel incorporates logic and data to implement software features, and the software product has an event sourcing architectural pattern in which the logic in the form of aggregate services are invoked by commands, and the data as events that describe changes in state of the software product are generated. The method includes automatically implementing the aggregate services, commands, and events to build the software product from the metamodel, using an event sourcing framework as a programming model.

24 Claims, 9 Drawing Sheets

DEVELOPING A SOFTWARE PRODUCT IN A NO-CODE DEVELOPMENT PLATFORM TO ADDRESS A PROBLEM RELATED TO A BUSINESS DOMAIN

TECHNOLOGICAL FIELD

The present disclosure relates generally to software development and, in particular, to development of a software product in a no-code development platform to address a problem related to a business domain.

BACKGROUND

Software development relates to creating and maintaining computer software, and often includes designing, programming, documenting, testing and debugging software products. In this context, software developers are generally highly-skilled individuals who create software, and include programmers who create source code that represents the software in a human-readable programming language. A compiler then converts some intermediate representation of the source code into a form that is executable by a computer or other machine.

Traditional software development suffers from a number of drawbacks, including the skill often required to create a software product. In some software development projects, automatic programming may be employed to allow the developer (or programmer) to create software at some higher-level of abstraction, which may then be applied to a code generation platform that creates the source code. These platforms include low-code development platforms (LCDPs), no-code development platform (NCDPs), and the like. But even these platforms have their limitations. In particular, for example, a number of code generation platforms are limited to building traditional mutable entities, such as create, read, update and delete (CRUD). A number of platforms are also quite structured in the input they are able to process.

It would therefore be desirable to have a system and method that takes into account at least some of the issues discussed above, as well as other possible issues.

BRIEF SUMMARY

Example implementations of the present disclosure are directed to software development and, in particular, to development of a software product in a no-code development platform (NCDP) to address a problem related to a business domain. Example implementations address and overcome technical challenges associated with the need for highly-skilled developers to manually build complex event-sourced software products. In this regard, example implementations provide an architecture and method for designing and building an event-sourced software product based on a domain-driven design (DDD) natural language for the business domain, and which may include visual artifacts that drive the design, generating a metamodel from design instructions and according to the DDD natural language, and enabling modification of the metamodel without software code.

Example implementations of the present disclosure may avoid conventional design documents yet provide design decision history to show an incremental design of the software product, as well as "end state" design artifacts through a design log feature. Example implementations may build a set of microservices to represent the software product, and leverage a context driven, natural language interface to interact with the software product at runtime. Example implementations may further reduce complexity in testing the behavior of the software product using natural language to capture test cases, and record tests for repeated regression testing.

The present disclosure thus includes, without limitation, the following example implementations.

Some example implementations provide a method of developing a software product in a no-code development platform (NCDP) to address a problem related to a business domain, the method comprising designing and thereby producing a design of the software product in the NCDP, including: receiving design instructions describing software features to achieve a user experience design for the software product, the design instructions composed in a semi-structured grammar of a domain-driven design (DDD) natural language for the business domain; and generating a metamodel from the design instructions and according to the DDD natural language, the metamodel incorporating logic and data to implement the software features, the software product having an event sourcing architectural pattern in which the logic in the form of one or more aggregate services are invoked by commands, and the data in the form of events that describe changes in state of the software product are generated and published to an event store; automatically implementing the one or more aggregate services, commands, and events to build the software product from the metamodel, using an event sourcing framework as a programming model for the software product, and without requiring user coding of the software product; and deploying the software product for use to address the problem related to the business domain.

Some example implementations provide an apparatus for developing a software product in a NCDP to address a problem related to a business domain, the apparatus comprising a memory configured to store computer-readable program code; and processing circuitry configured to access the memory, and execute the computer-readable program code to cause the apparatus to at least perform the method of any preceding example implementation, or any combination of any preceding example implementations.

Some example implementations provide a computer-readable storage medium for developing a software product in a NCDP to address a problem related to a business domain, the computer-readable storage medium being non-transitory and having computer-readable program code stored therein that, in response to execution by processing circuitry, causes an apparatus to at least perform the method of any preceding example implementation, or any combination of any preceding example implementations.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

DETAILED DESCRIPTION

Figure 1:
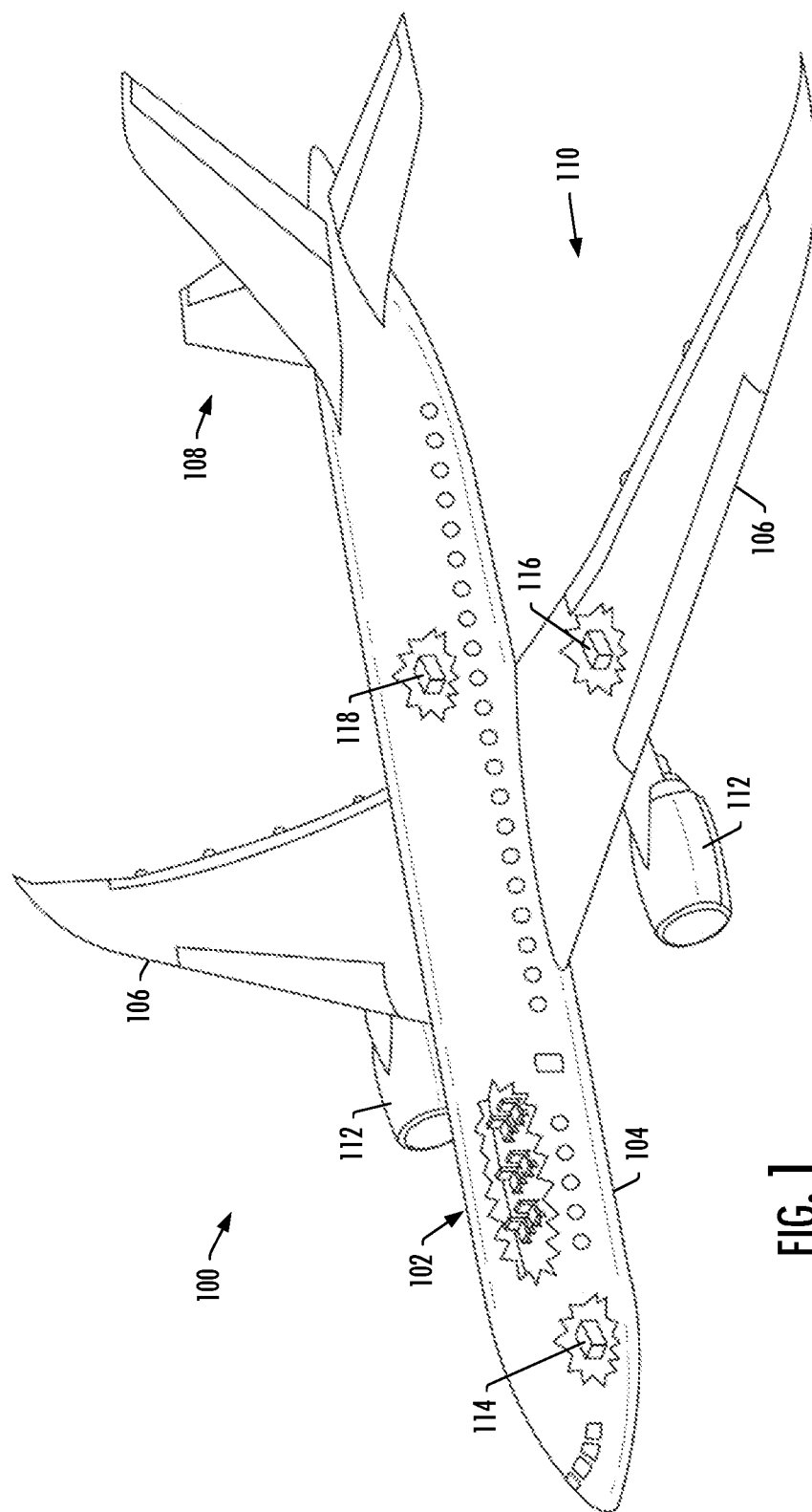
FIG. 1 illustrates an aircraft for which a digital twin may be developed according to some example implementations of the present disclosure.

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data," "content," "digital content," "information," and similar terms may be at times used interchangeably.

Example implementations of the present disclosure are directed to software development and, in particular, to development of a software product in a no-code development platform (NCDP) to address a problem related to a business domain. Example implementations enable designers and builders to collaboratively design, test, and deploy the software product, without the need to write new code in order to make or execute modifications (e.g., building an event sourced application, without programming, no need for traditional programming language or an event sourcing framework to build an application="no code environment"). Example implementations can further enable faster migration of existing legacy systems into modern cloud-native software products by focusing on the extraction of a business capability. Product owners and system designers can express capability in natural language, applying domain-driven design principles and produce working systems from those instructions alone.

More particularly, example implementations follow domain-driven design in which the structure and language of the software product are aligned with the business domain, and more particularly the problem related to the business domain. Example implementations can have applicability in any of a number of different business domains. One example of a suitable business domain is the design and engineering of some physical products such as aircraft, a digital twin can be used to represent the product or system for its production. The digital twin may include a digital replica of the product/system. The digital twin can provide a surrogate that understands the behaviors and properties of the product/system through analytics and simulation.

FIG. 1 illustrates one type of aircraft 100 in a business domain that can benefit from example implementations of the present disclosure. As shown, the aircraft includes an airframe 102 with a fuselage 104, wings 106 and tail 108. The aircraft also includes a plurality of high-level systems 110 such as a propulsion system. In the particular example shown in FIG. 1, the propulsion system includes two wing-mounted engines 112. In other embodiments, the propulsion system can include other arrangements, for example, engines carried by other portions of the aircraft including the fuselage and/or the tail. The high-level systems can also include an electrical system 114, hydraulic system 116 and/or environmental system 118. Any number of other systems may be included.

Figure 2A:
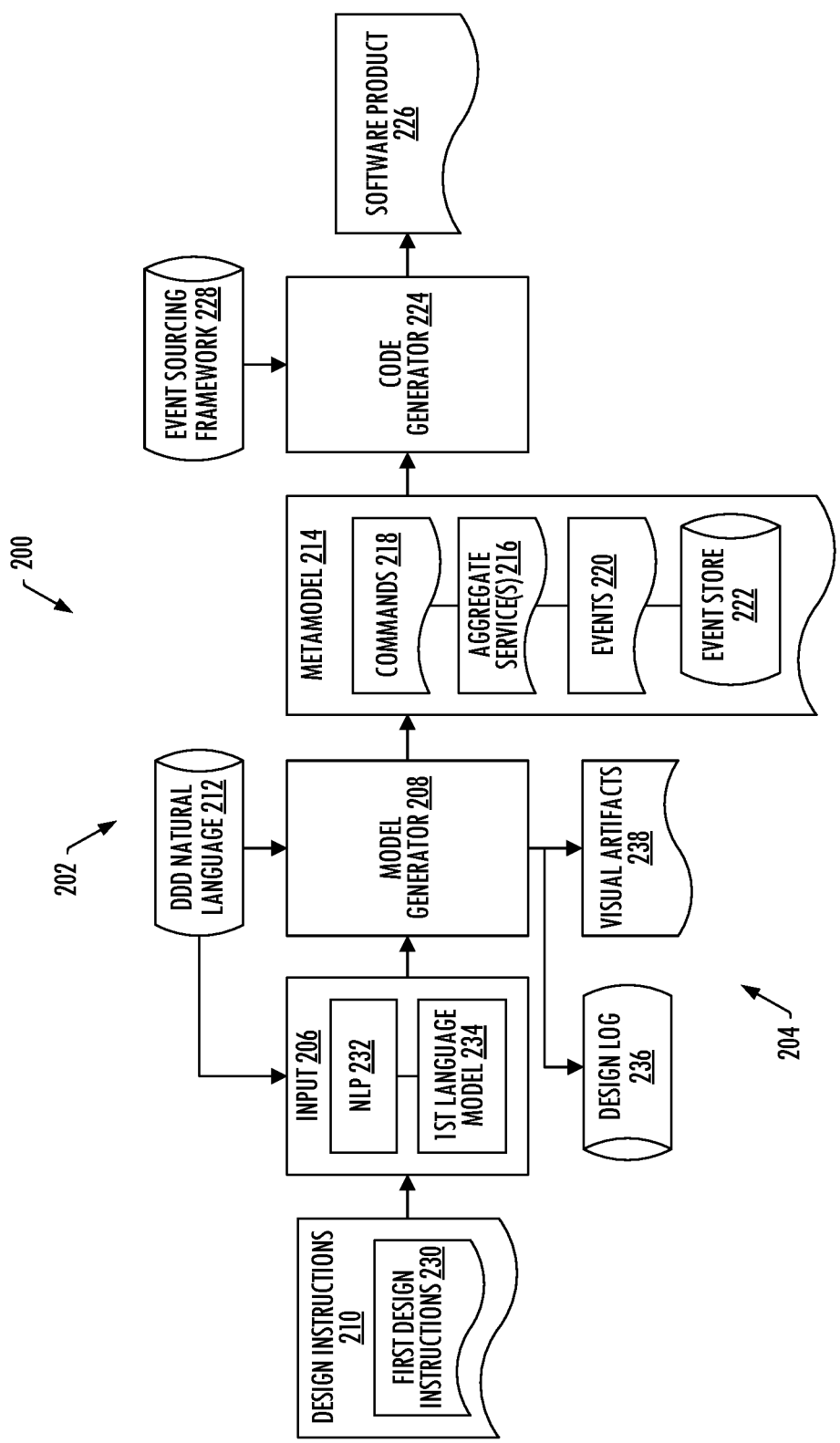
FIGS. 2A and 2B illustrate a system for developing a software product in a no-code development platform (NCDP) to address a problem related to a business domain, according to various example implementations.
Figure 2B:
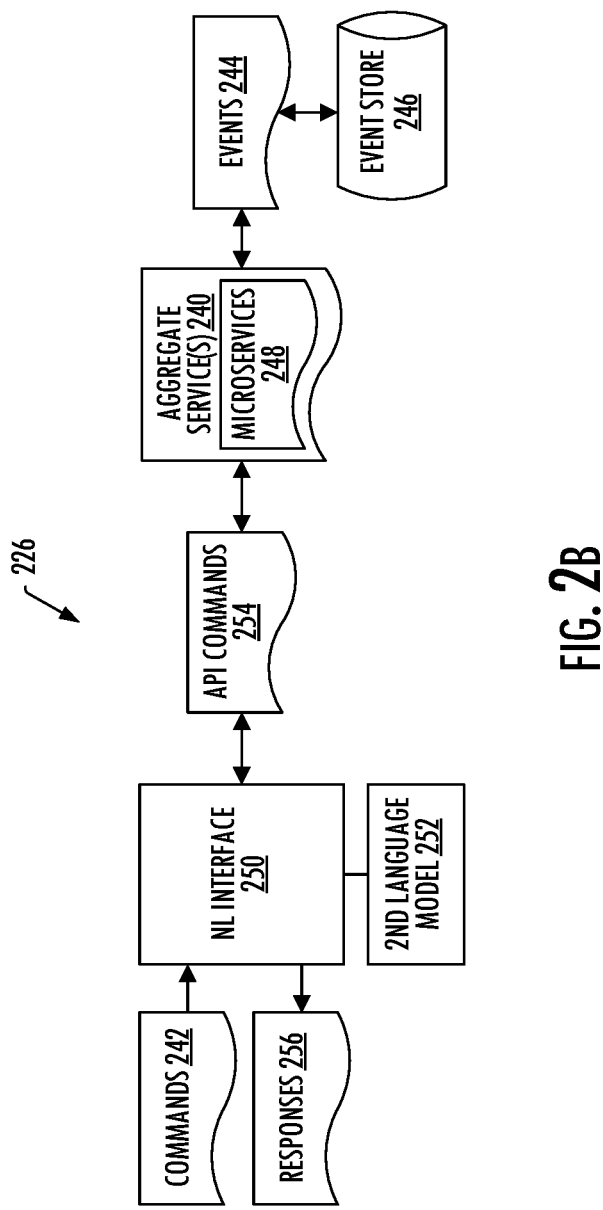

FIGS. 2A and 2B illustrate a system 200 for developing a software product in a no-code development platform (NCDP) 202 to address a problem related to a business domain, according to various example implementations of the present disclosure. In the context of an aircraft such as the aircraft 100 shown in FIG. 1, the software product can be or include a digital twin of the aircraft or production system. The system 200 can include any of a number of different subsystems (each an individual system) for performing one or more functions or operations. One or more of the subsystems can be co-located or directly coupled to one another, or in some examples, various ones of the subsystems can communicate with one another across one or more computer networks. Although shown as part of the system, it should be understood that any one or more of the subsystems can function or operate as a separate system without regard to any of the other subsystems. It should also be understood that the systems can include one or more additional or alternative subsystems than those shown in the figures.

As shown in FIG. 2A, the system 200 includes a design generator 204 configured to design and thereby produce a design of the software product in the NCDP 202. The design generator includes an input component 206 and a model generator 208. The input component is configured to receive design instructions 210 describing software features to achieve a user experience design for the software product. In some examples, the software features are distinguishing characteristics of the software product that are intended to achieve the user experience design.

The design instructions 210 are composed in a semi-structured grammar of a domain-driven design (DDD) natural language 212 for the business domain; and in this regard, the design instructions can include primitives of the DDD natural language. The DDD natural language can be in a bounded context of the problem related to the business domain. Some business domains, then, can include different sets of primitives for the bounded contexts of different problems related to the business domain. The DDD natural language in some examples describes primitive objects distilled from implementations of event sourced systems and domain-driven design concepts; and when based on event sourcing, the DDD natural language can include the definition of events and how those events can be projected to create a domain model.

Figure 3:
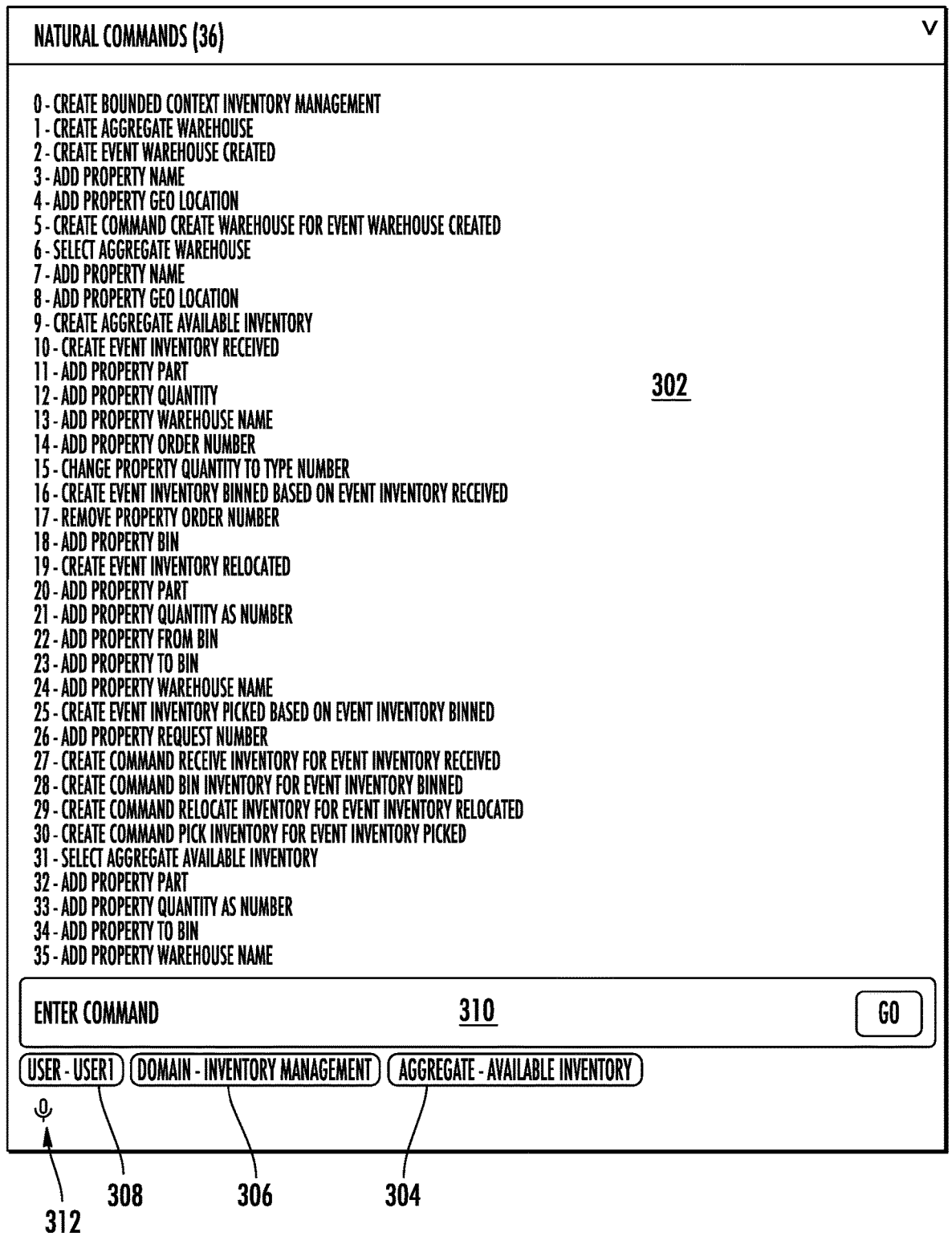
FIG. 3 illustrates an example graphical user interface (GUI) that may be provided to receive design instructions, according to some example implementations.

FIG. 3 illustrates an example graphical user interface (GUI) 300 that can be provided by the input component 206 to receive design instructions 210, according to some example implementations. As shown, the GUI includes a set of design instructions 302 for commands that can be incorporated in a software product to address at least available inventory 304 in an inventory management domain 306, and which can be received further in the context of a particular user 308.

Returning to FIG. 2A, the model generator 208 is configured to generate a metamodel 214 from the design instructions and according to the DDD natural language 212. The metamodel incorporates logic and data to implement the software features. According to some examples, the software product has an event sourcing architectural pattern in which the logic in the form of one or more aggregate services 216 are invoked by commands 218, and the data in the form of events 220 that describe changes in state of the software product are generated and published to an event store 222. Further as explained above, in domain-driven design, the metamodel can be a domain model with objects having an event sourcing architectural pattern, and an aggregate can refer to an object that does not refer to other objects, or a cluster of objects treated as a unit. These objects are the building blocks to express, create and retrieve the metamodel. In this context, the commands can be user-facing, and the events can be domain-facing. Another suitable object is a projection or read model for reads, which uses events from the event store to build and maintain a model for answering queries.

The system 200 further includes a code generator 224 configured to automatically implement the one or more aggregate services, commands, and events to build the software product 226 from the metamodel. In this regard, the code generator is configured to build the software product using an event sourcing framework 228 as a programming model for the software product, and without requiring user coding of the software product. Examples of suitable event sourcing frameworks include Eventuate, Lagom, Axon, and the like.

In various examples, the code generator 224 is configured to build the software product 226 using a third-generation programming language (3GL), a fourth-generation programming language (4GL), a fifth-generation programming language (5GL), or some combination of 3GL, 4GL and/or 5GL programming languages. In this regard, in some examples, the code generator 224 is configured to build the software product 226 using a 3GL such as Java, Scala, or the like. In some of these examples, the code generator can build the software product based on intelligent templates and optimized the application based on use of existing event sourcing frameworks. This can be similar to other model-driven application approaches, with a number of additional capabilities as described herein, such as natural language processing to interact with the system as well as the software product when deployed.

In some examples, the code generator 224 is configured to build the software product 226 using a 4GL such as an interpreted language. In some of these examples, a dynamic runtime system can be built that natively understands the DDD natural language 212 and the metamodel 214, and that provides the software product capability without building and compiling an intermediate representation. The software product runtime can include the additional capabilities as described herein, such as the natural language processing to interact with the system as well as the software product when deployed.

In some examples, the code generator 224 is configured to build the software product 226 using a 5GL where artificial intelligence can be used to infer the software product from the metamodel 214. Some of these examples can follow examples in which the software product is built using a 3GL programming language; and with continued use of the software product, artificial intelligence can use a knowledge base of turning design language into code, to write the code. These examples can leverage other generic artificial-intelligence-based coding patterns to create a system to build software products based on a specific design meta language. As in other examples, again, software product runtime can include the additional capabilities as described herein, such as the natural language processing to interact with the system as well as the software product when deployed.

Regardless of the exact manner by which the software product 226 is built, the code generator 224 is then configured to configured to deploy the software product for use to address the problem related to the business domain. Before deployment of the software product, however, the software product can undergo further development, building, testing and the like. In this regard, testing the software product can include testing the behavior of the software product using natural language to capture test cases, and record tests for repeated regression testing.

The design instructions can include first design instructions 230 for the events 220. In some of these examples, the input component 206 is configured to receive natural-language user input that conveys at least some of the first design instructions. The input component includes a natural language processor (NLP) 232 configured to perform natural-language processing to recognize and translate the natural-language user input to the first design instructions, and the input component is configured to convert the first design instructions to the events. The natural-language processing is performed according to a first language model 234 trained to the semi-structured grammar of the DDD natural language 212. The natural-language user input can include text input, speech, interactive diagrams or the like, and the input component can include additional or alternative means for processing the natural-language user input. In this regard, the input component can include a speech recognition component to process natural-language user input that includes speech input. In the GUI 300 of FIG. 3, for example, the input component 206 can accept text input in a text field 310, and can be activated to accept speech input user selection of an appropriate user interface element 312.

The software product 226 can be designed incrementally in which the design instructions 210 include incremental design changes. The metamodel 214, then, can be updated contemporaneous with the incremental design changes, and a context of the design instructions is retained for a flow of additional design instructions are also in the context.

More particularly, the design generator 204, or its input component 206 or model generator 208, can be configured to maintain a design log 236 of the design instructions 210 and incremental design changes. This may also be where the context of the design instructions is retained. The design log can be used to drive the system 200, and enable traceability of the design of the software product 226 as the software product is incrementally designed. This traceability can be used for a number of purposes such as an providing an audit trail, enabling behavior analytics like what design features remain unchanged, identifying trends in design changes, identifying design changes that happen together, and the like.

During design of the software product 226, the design log 236 can provide an audit trail of successful and unsuccessful commands 218. Valid commands can be stored in the design log and used to create read projections for the DDD natural language. The design log can be used in the software product 226 to access commands 242 as implemented. As deployed, the design log can provide an audit trail of successful and unsuccessful commands. Most commands result in recording events 244, and this can be used to create read projections of the aggregate services 240. In both design and deployment, then, the design log can be used to store a command log for audit purposes, and used to improve the system 200 by analyzing misunderstood or invalid commands. The system can include built-in controls to manage context switching, and for the software product, at least some of these controls can be automatically provided based on the DDD objects designed into the software product.

The design generator 204, or one or more of its input component 206 or model generator 208, can be configured to generate one or more visual artifacts 238 of the design from the metamodel 214. In some of these examples, the one or more visual artifacts can drive at least some of the incremental design changes. The visual artifacts can be generated directly from the metamodel; or in some examples, read projections can be generated from the metamodel, and the visual artifacts can be generated from the read projections.

The visual artifacts 238 can provide two-dimensional or three-dimensional interactive models of the design for various perspectives, and with various levels of fidelity. Examples of suitable visual artifacts include a context map and relationships, a high level class diagram of events and projections in a bounded context, a deployment diagram, a detailed aggregate/entity model with properties, an event-to-aggregate mapping chart, a user story or user experience design to command mapping, event storm user story, and the like. In some examples, the visual artifacts can include editable diagrams such as to allow the selection of objects of the design to change context that impact speech commands if used in conjunction with the diagrams. Events in the design can be raised when objects are edited on the diagram, like one or more of renaming objects, deleting objects, adding objects, connecting objects with drag and drop, and the like.

Figure 4:
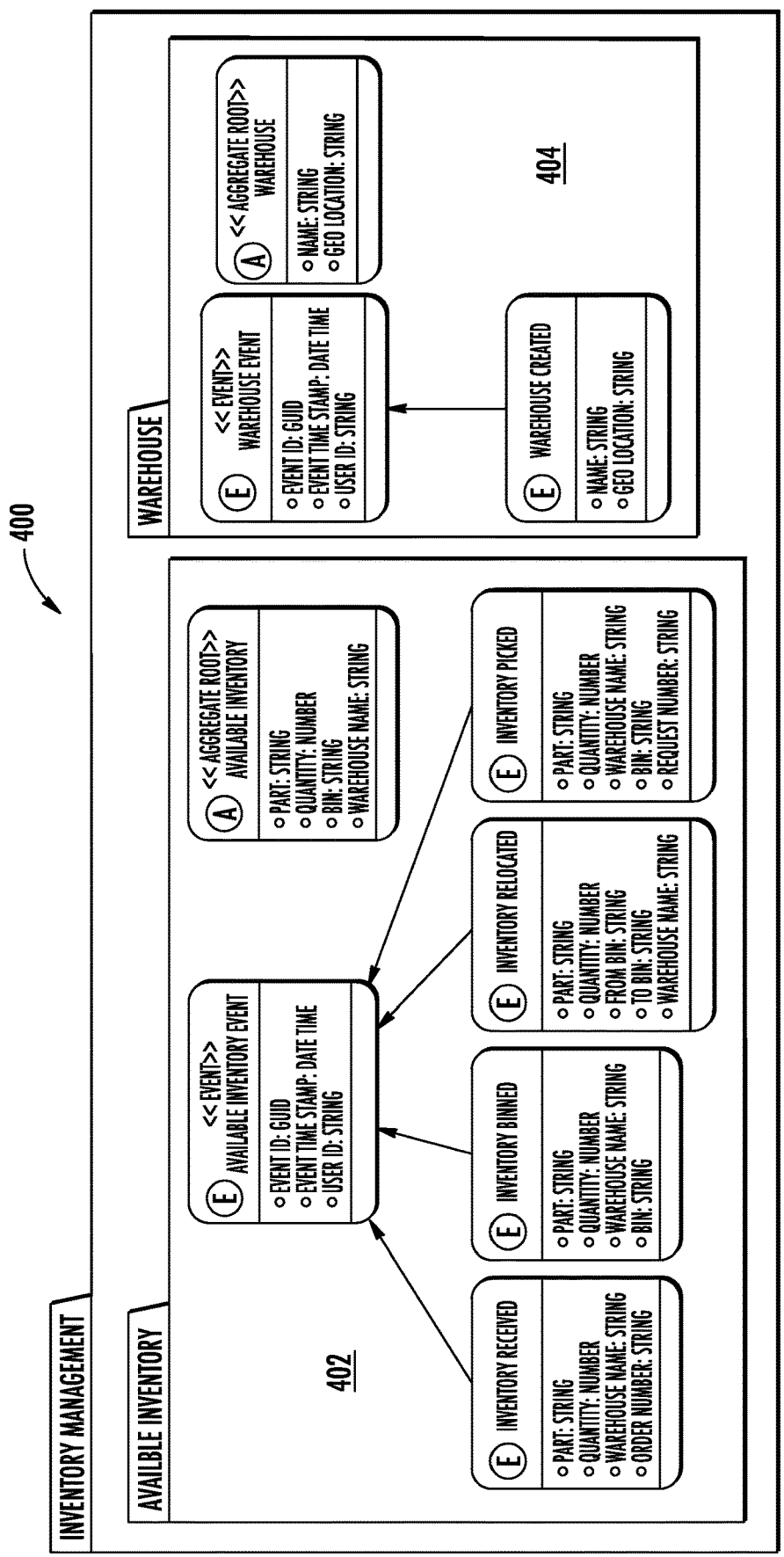
FIG. 4 illustrates one example of a suitable visual artifact that may be generated according to some example implementations.

FIG. 4 illustrates a context diagram panel 400 for the inventory management domain 306 from FIG. 3, including a context diagram 402 for the available inventory 304, and another context diagram 404 for a warehouse in the domain.

FIG. 2B illustrates the software product 226 that can be built by the code generator 224 according to some example implementations. As shown, the software product includes implementations of the one or more aggregate services 240 that are invoked by commands 242, and from which events 244 that describe changes in state of the software product are generated and published to an event store 246. The one or more aggregate services are automatically implemented as microservices 248 whereby the software product is arranged as a collection of these loosely coupled services.

The code generator 224 can be configured to build the software product 226 with a natural-language (NL) interface 250 to recognize and translate natural-language user input to one or more of the commands 242. In some of these examples, the natural-language interface is built according to a second language model 252 trained to the semi-structured grammar of the DDD natural language 212.

Deployment of the software product 226 can include execution of the software product. In some of these examples, the software product is used to receive natural-language user input that conveys one or more of the commands 242. The NL interface 250 is configured to perform natural-language processing to recognize and translate the natural-language user input to the one or more of the commands, such as in a manner similar to that described above. In some examples, the natural-language processing is performed according to the second language model 252 trained to one or more parts of speech of lexical items used by the commands in the metamodel 214, such as nouns and verbs of words used by the commands in the metamodel. The NL interface can also be configured to convert the one or more of the commands to corresponding programmatic application programming interface (API) commands 254. And from these API commands, at least one of the one or more aggregate services 240 are invoked by the software product that is built to return responses 256 to the one or more of the commands according to the second language model.

Figure 5A:
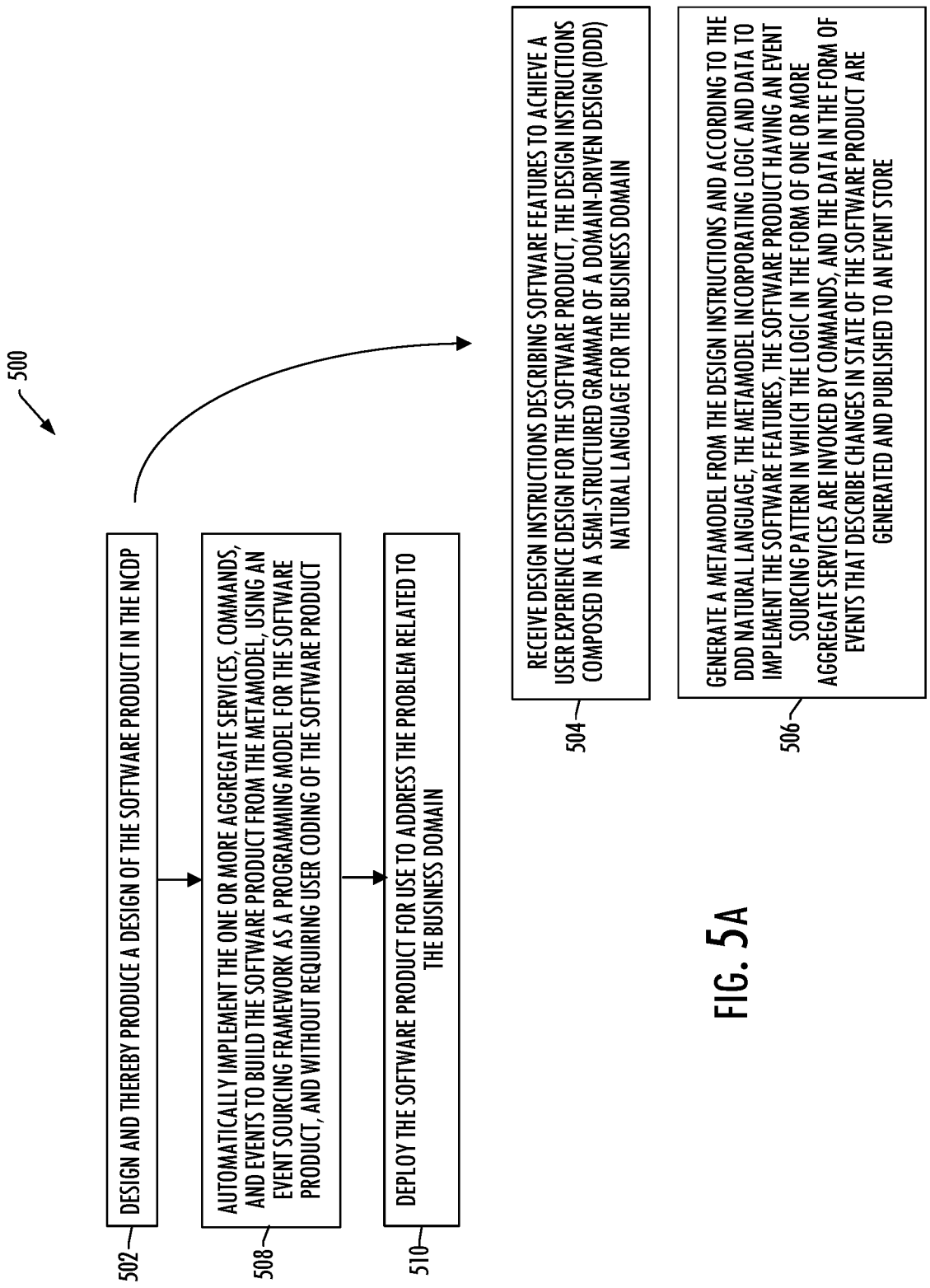
FIGS. 5A, 5B, 5C, 5D, 5E and 5F are flowcharts illustrating various steps in a method 500 of developing a software product in a NCDP to address a problem related to a business domain, according to various example implementations.

FIGS. 5A-5F are flowcharts illustrating various steps in a method 500 of developing a software product in a no-code development platform (NCDP) to address a problem related to a business domain, according to various example implementations of the present disclosure. The method includes designing and thereby producing a design of the software product in the NCDP, as shown in FIG. 5A at block 502. Designing the software product includes receiving design instructions describing software features to achieve a user experience design for the software product, the design instructions composed in a semi-structured grammar of a domain-driven design (DDD) natural language for the business domain, as shown at block 504. A metamodel is generated from the design instructions and according to the DDD natural language, as shown at block 506.

The metamodel incorporates logic and data to implement the software features, the software product having an event sourcing architectural pattern in which the logic in the form of one or more aggregate services are invoked by commands, and the data in the form of events that describe changes in state of the software product are generated and published to an event store. The method further includes automatically implementing the one or more aggregate services, commands, and events to build the software product from the metamodel, using an event sourcing framework as a programming model for the software product, and without requiring user coding of the software product, as shown at block 508. And the method includes deploying the software product for use to address the problem related to the business domain, as shown at block 510.

Figure 5B:
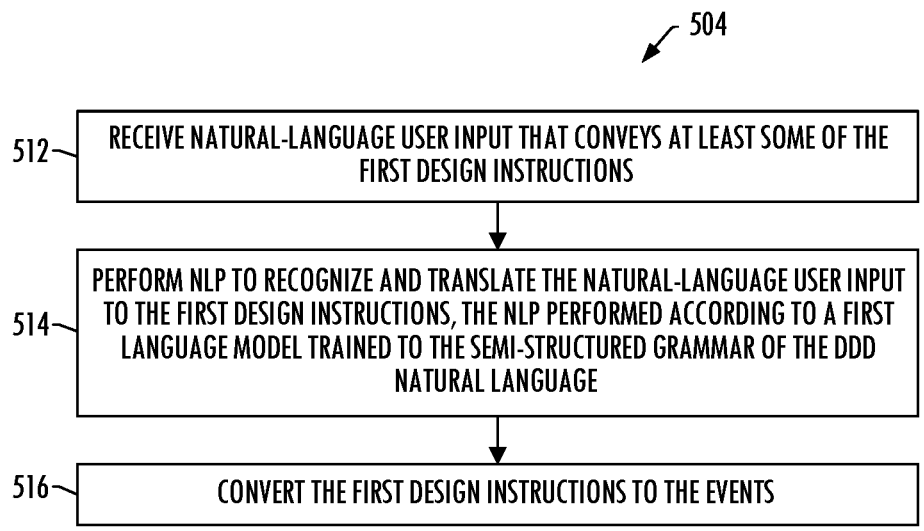

The design instructions can include first design instructions for the events, and receiving the design instructions at block 504 includes receiving natural-language user input that conveys at least some of the first design instructions, as shown in FIG. 5B at block 512. Natural-language processing (NLP) is performed to recognize and translate the natural-language user input to the first design instructions, and performed according to a first language model trained to the semi-structured grammar of the DDD natural language, as shown at block 514. The first design instructions, then, are converted to the events, as shown at block 516.

The software product can be designed incrementally in which the design instructions include incremental design changes. In some of these examples, the metamodel is updated contemporaneous with the incremental design changes, and a context of the design instructions is retained for a flow of additional design instructions are also in the context.

Figure 5C:
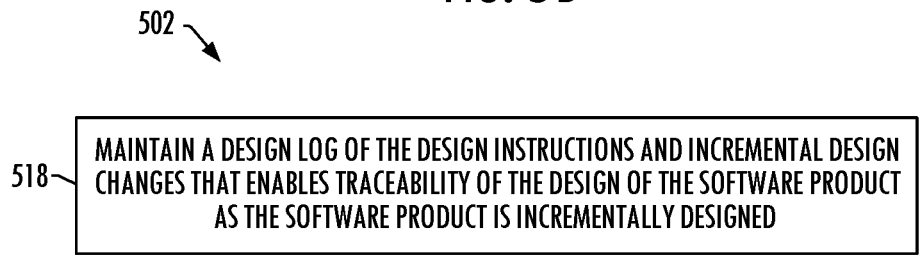

Designing the software product at block 502 can further include maintaining a design log of the design instructions and incremental design changes that enables traceability of the design of the software product as the software product is incrementally designed, as shown at block 518 of FIG. 5C.

Figure 5D:

Designing the software product further at block 502 can include generating one or more visual artifacts of the design from the metamodel, and that drive at least some of the incremental design changes, as shown at block 520 of FIG. 5D. In some examples, the one or more aggregate services are automatically implemented as microservices.

Figure 5E:
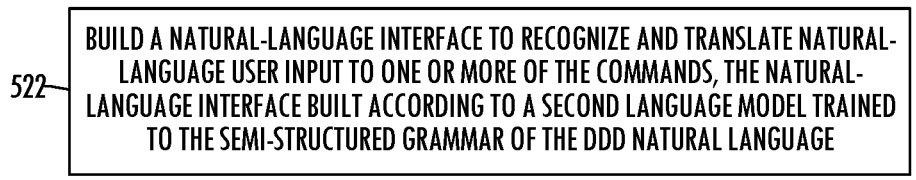

Automatically implementing the one or more aggregate services, commands, and events at block 508 can include building a natural-language interface to recognize and translate natural-language user input to one or more of the commands, as shown at block 522 of FIG. 5E. In some of these examples, the natural-language interface is built according to a second language model trained to the semi-structured grammar of the DDD natural language.

Figure 5F:
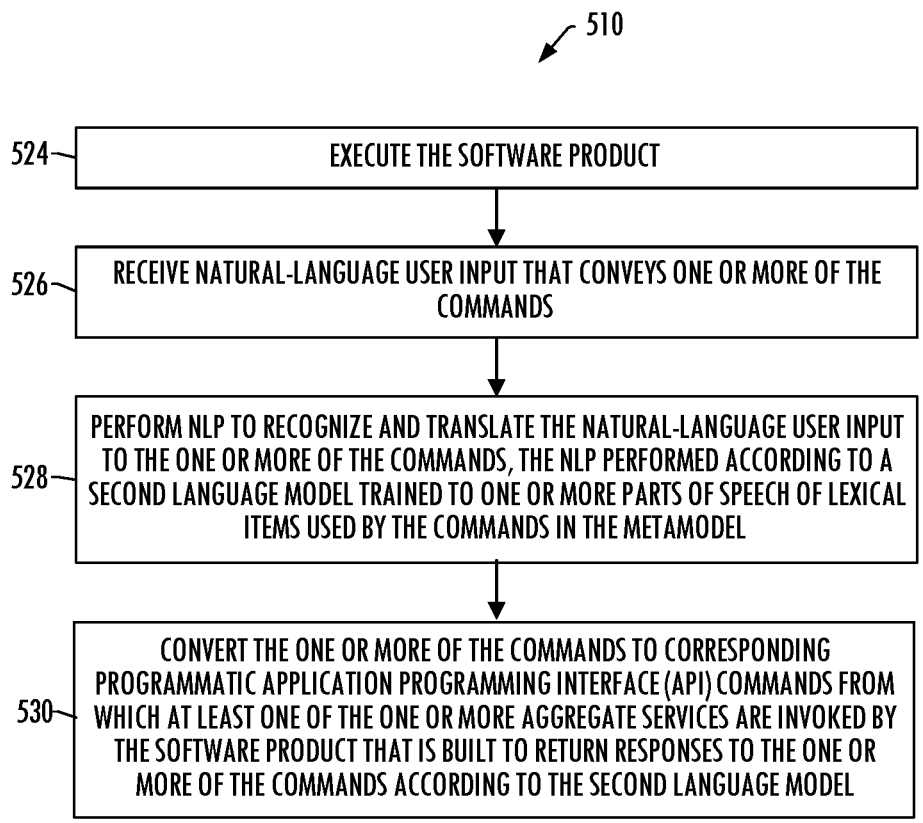

In some examples, deploying the software product at block 510 includes executing the software product, as shown in FIG. 5F at block 524. In some of these examples, using the software product, natural-language user input that conveys one or more of the commands is received, as shown at block 526. Similar to above, NLP is performed to recognize and translate the natural-language user input to the one or more of the commands, as shown at block 528. The NLP performed according to a second language model trained to one or more parts of speech of lexical items used by the commands in the metamodel. The one or more of the commands are converted to corresponding programmatic application programming interface (API) commands, as shown at block 530. And from these API commands, at least one of the one or more aggregate services are invoked by the software product that is built to return responses to the one or more of the commands according to the second language model.

According to example implementations of the present disclosure, the system 200 and its subsystems may be implemented by various means. Means for implementing the system and its subsystems may include hardware, alone or under direction of one or more computer programs from a computer-readable storage medium. In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network or the like.

Figure 6:
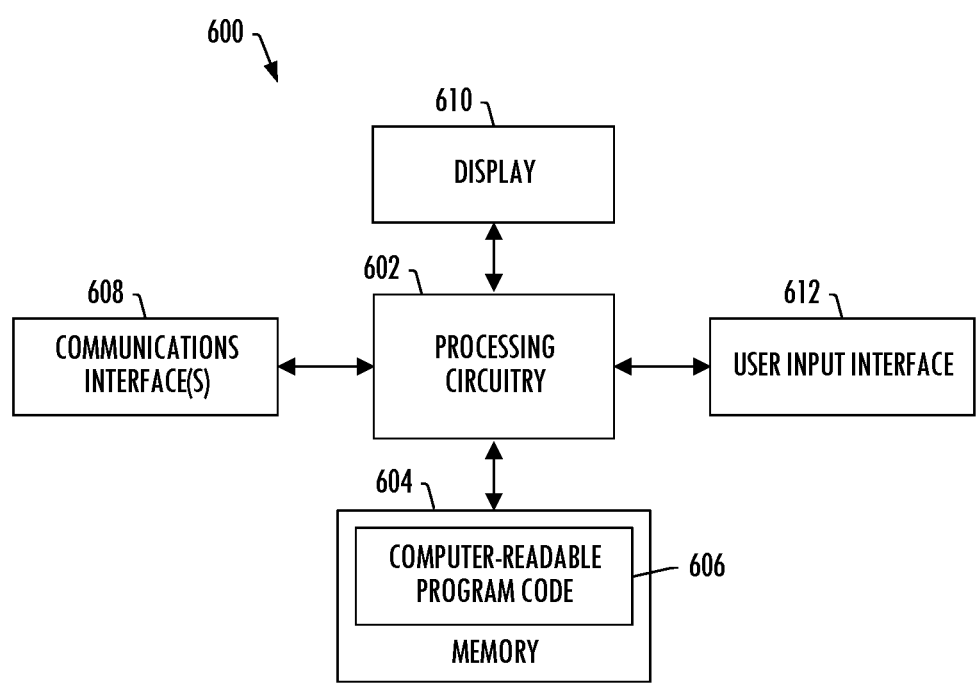
FIG. 6 illustrates an apparatus according to some example implementations.

FIG. 6 illustrates an apparatus 600 according to some example implementations of the present disclosure. Generally, an apparatus of exemplary implementations of the present disclosure can comprise, include or be embodied in one or more fixed or portable electronic devices. Examples of suitable electronic devices include a smartphone, tablet computer, laptop computer, desktop computer, workstation computer, server computer or the like. The apparatus can include one or more of each of a number of components such as, for example, processing circuitry 602 (e.g., processor unit) connected to a memory 604 (e.g., storage device).

The processing circuitry 602 can be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which can be packaged as an integrated circuit or multiple interconnected integrated circuits (an integrated circuit at times more commonly referred to as a "chip"). The processing circuitry can be configured to execute computer programs, which can be stored onboard the processing circuitry or otherwise stored in the memory 604 (of the same or another apparatus).

The processing circuitry 602 can be a number of processors, a multi-core processor or some other type of processor, depending on the particular implementation. Further, the processing circuitry can be implemented using a number of heterogeneous processor systems in which a main processor is present with one or more secondary processors on a single chip. As another illustrative example, the processing circuitry can be a symmetric multi-processor system containing multiple processors of the same type. In yet another example, the processing circuitry can be embodied as or otherwise include one or more ASICs, FPGAs or the like. Thus, although the processing circuitry can be capable of executing a computer program to perform one or more functions, the processing circuitry of various examples can be capable of performing one or more functions without the aid of a computer program. In either instance, the processing circuitry can be appropriately programmed to perform functions or operations according to example implementations of the present disclosure.

The memory 604 is generally any piece of computer hardware that is capable of storing information such as, for example, data, computer programs (e.g., computer-readable program code 606) and/or other suitable information either on a temporary basis and/or a permanent basis. The memory can include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk—read only memory (CD-ROM), compact disk—read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 604, the processing circuitry 602 can also be connected to one or more interfaces for displaying, transmitting and/or receiving information. The interfaces can include a communications interface 608 (e.g., communications unit) and/or one or more user interfaces. The communications interface can be configured to transmit and/or receive information, such as to and/or from other apparatus(es), network(s) or the like. The communications interface can be configured to transmit and/or receive information by physical (wired) and/or wireless communications links. Examples of suitable communication interfaces include a network interface controller (NIC), wireless NIC (WNIC) or the like.

The user interfaces can include a display 610 and/or one or more user input interfaces 612 (e.g., input/output unit). The display can be configured to present or otherwise display information to a user, suitable examples of which include a liquid crystal display (LCD), light-emitting diode display (LED), plasma display panel (PDP) or the like. The user input interfaces can be wired or wireless, and can be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces can further include one or more interfaces for communicating with peripherals such as printers, scanners or the like.

As indicated above, program code instructions can be stored in memory, and executed by processing circuitry that is thereby programmed, to implement functions of the systems, subsystems, tools and their respective elements described herein. As will be appreciated, any suitable program code instructions can be loaded onto a computer or other programmable apparatus from a computer-readable storage medium to produce a particular machine, such that the particular machine becomes a means for implementing the functions specified herein. These program code instructions can also be stored in a computer-readable storage medium that can direct a computer, a processing circuitry or other programmable apparatus to function in a particular manner to thereby generate a particular machine or particular article of manufacture. The instructions stored in the computer-readable storage medium can produce an article of manufacture, where the article of manufacture becomes a means for implementing functions described herein. The program code instructions can be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions can be performed sequentially such that one instruction is retrieved, loaded and executed at a time. In some example implementations, retrieval, loading and/or execution can be performed in parallel such that multiple instructions are retrieved, loaded, and/or executed together. Execution of the program code instructions can produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 600 can include a processing circuitry 602 and a computer-readable storage medium or memory 604 coupled to the processing circuitry, where the processing circuitry is configured to execute computer-readable program code 606 stored in the memory. It will also be understood that one or more functions, and combinations of functions, can be implemented by special purpose hardware-based computer systems and/or processing circuitry which perform the specified functions, or combinations of special purpose hardware and program code instructions.

As explained above and reiterated below, the present disclosure includes, without limitation, the following example implementations.

Clause 1. An apparatus for developing a software product in a no-code development platform (NCDP) to address a problem related to a business domain, the apparatus comprising: a memory configured to store computer-readable program code; and processing circuitry configured to access the memory, and execute the computer-readable program code to cause the apparatus to at least: design and thereby produce a design of the software product in the NCDP, including the apparatus caused to: receive design instructions describing software features to achieve a user experience design for the software product, the design instructions composed in a semi-structured grammar of a domain-driven design (DDD) natural language for the business domain; and generate a metamodel from the design instructions and according to the DDD natural language, the metamodel incorporating logic and data to implement the software features, the software product having an event sourcing architectural pattern in which the logic in the form of one or more aggregate services are invoked by commands, and the data in the form of events that describe changes in state of the software product are generated and published to an event store; automatically implement the one or more aggregate services, commands, and events to build the software product from the metamodel, using an event sourcing framework as a programming model for the software product, and without requiring user coding of the software product; and deploy the software product for use to address the problem related to the business domain.

Clause 2. The apparatus of clause 1, wherein the design instructions include first design instructions for the events, and the apparatus caused to receive the design instructions includes the apparatus caused to: receive natural-language user input that conveys at least some of the first design instructions; perform natural-language processing to recognize and translate the natural-language user input to the first design instructions, the natural-language processing performed according to a first language model trained to the semi-structured grammar of the DDD natural language; and convert the first design instructions to the events.

Clause 3. The apparatus of clause 1 or clause 2, wherein the software product is designed incrementally in which the design instructions include incremental design changes, and in which the metamodel is updated contemporaneous with the incremental design changes, and a context of the design instructions is retained for a flow of additional design instructions are also in the context.

Clause 4. The apparatus of clause 3, wherein the apparatus caused to design the software product further includes the apparatus caused to maintain a design log of the design instructions and incremental design changes that enables traceability of the design of the software product as the software product is incrementally designed.

Clause 5. The apparatus of clause 3 or clause 4, wherein the apparatus caused to design the software product further includes the apparatus caused to generate one or more visual artifacts of the design from the metamodel, and that drive at least some of the incremental design changes.

Clause 6. The apparatus of any of clauses 1 to 5, wherein the one or more aggregate services are automatically implemented as microservices.

Clause 7. The apparatus of any of clauses 1 to 6, wherein the apparatus caused to automatically implement the one or more aggregate services, commands, and events includes the apparatus caused to build a natural-language interface to recognize and translate natural-language user input to one or more of the commands, the natural-language interface built according to a second language model trained to the semi-structured grammar of the DDD natural language.

Clause 8. The apparatus of any of clauses 1 to 7, wherein the apparatus caused to deploy the software product includes the apparatus caused to at least: execute the software product; and using the software product, receive natural-language user input that conveys one or more of the commands; perform natural-language processing to recognize and translate the natural-language user input to the one or more of the commands, the natural-language processing performed according to a second language model trained to one or more parts of speech of lexical items used by the commands in the metamodel; and convert the one or more of the commands to corresponding programmatic application programming interface (API) commands from which at least one of the one or more aggregate services are invoked by the software product that is built to return responses to the one or more of the commands according to the second language model.

Clause 9. A method of developing a software product in a no-code development platform (NCDP) to address a problem related to a business domain, the method comprising: designing and thereby producing a design of the software product in the NCDP, including: receiving design instructions describing software features to achieve a user experience design for the software product, the design instructions composed in a semi-structured grammar of a domain-driven design (DDD) natural language for the business domain; and generating a metamodel from the design instructions and according to the DDD natural language, the metamodel incorporating logic and data to implement the software features, the software product having an event sourcing architectural pattern in which the logic in the form of one or more aggregate services are invoked by commands, and the data in the form of events that describe changes in state of the software product are generated and published to an event store; automatically implementing the one or more aggregate services, commands, and events to build the software product from the metamodel, using an event sourcing framework as a programming model for the software product, and without requiring user coding of the software product; and deploying the software product for use to address the problem related to the business domain.

Clause 10. The method of clause 9, wherein the design instructions include first design instructions for the events, and receiving the design instructions comprises: receiving natural-language user input that conveys at least some of the first design instructions; performing natural-language processing to recognize and translate the natural-language user input to the first design instructions, the natural-language processing performed according to a first language model trained to the semi-structured grammar of the DDD natural language; and converting the first design instructions to the events.

Clause 11. The method of clause 9 or clause 10, wherein the software product is designed incrementally in which the design instructions include incremental design changes, and in which the metamodel is updated contemporaneous with the incremental design changes, and a context of the design instructions is retained for a flow of additional design instructions are also in the context.

Clause 12. The method of clause 11, wherein designing the software product further comprises maintaining a design log of the design instructions and incremental design changes that enables traceability of the design of the software product as the software product is incrementally designed.

Clause 13. The method of clause 11 or clause 12, wherein designing the software product further comprises generating one or more visual artifacts of the design from the metamodel, and that drive at least some of the incremental design changes.

Clause 14. The method of any of clauses 9 to 13, wherein the one or more aggregate services are automatically implemented as microservices.

Clause 15. The method of any of clauses 9 to 14, wherein automatically implementing the one or more aggregate services, commands, and events includes building a natural-language interface to recognize and translate natural-language user input to one or more of the commands, the natural-language interface built according to a second language model trained to the semi-structured grammar of the DDD natural language.

Clause 16. The method of any of clauses 9 to 15, wherein deploying the software product includes at least: executing the software product; and using the software product, receiving natural-language user input that conveys one or more of the commands; performing natural-language processing to recognize and translate the natural-language user input to the one or more of the commands, the natural-language processing performed according to a second language model trained to one or more parts of speech of lexical items used by the commands in the metamodel; and converting the one or more of the commands to corresponding programmatic application programming interface (API) commands from which at least one of the one or more aggregate services are invoked by the software product that is built to return responses to the one or more of the commands according to the second language model.

Clause 17. A computer-readable storage medium for developing a software product in a no-code development platform (NCDP) to address a problem related to a business domain, the computer-readable storage medium being non-transitory and having computer-readable program code stored therein that, in response to execution by processing circuitry, causes an apparatus to at least: design and thereby produce a design of the software product in the NCDP, including the apparatus caused to: receive design instructions describing software features to achieve a user experience design for the software product, the design instructions composed in a semi-structured grammar of a domain-driven design (DDD) natural language for the business domain; and generate a metamodel from the design instructions and according to the DDD natural language, the metamodel incorporating logic and data to implement the software features, the software product having an event sourcing architectural pattern in which the logic in the form of one or more aggregate services are invoked by commands, and the data in the form of events that describe changes in state of the software product are generated and published to an event store; automatically implement the one or more aggregate services, commands, and events to build the software product from the metamodel, using an event sourcing framework as a programming model for the software product, and without requiring user coding of the software product; and deploy the software product for use to address the problem related to the business domain.

Clause 18. The computer-readable storage medium of clause 17, wherein the design instructions include first design instructions for the events, and the apparatus caused to receive the design instructions includes the apparatus caused to: receive natural-language user input that conveys at least some of the first design instructions; perform natural-language processing to recognize and translate the natural-language user input to the first design instructions, the natural-language processing performed according to a first language model trained to the semi-structured grammar of the DDD natural language; and convert the first design instructions to the events.

Clause 19. The computer-readable storage medium of clause 17 or clause 18, wherein the software product is designed incrementally in which the design instructions include incremental design changes, and in which the metamodel is updated contemporaneous with the incremental design changes, and a context of the design instructions is retained for a flow of additional design instructions are also in the context.

Clause 20. The computer-readable storage medium of clause 19, wherein the apparatus caused to design the software product further includes the apparatus caused to maintain a design log of the design instructions and incremental design changes that enables traceability of the design of the software product as the software product is incrementally designed.

Clause 21. The computer-readable storage medium of clause 19 or clause 20, wherein the apparatus caused to design the software product further includes the apparatus caused to generate one or more visual artifacts of the design from the metamodel, and that drive at least some of the incremental design changes.

Clause 22. The computer-readable storage medium of any of clauses 17 to 21, wherein the one or more aggregate services are automatically implemented as microservices.

Clause 23. The computer-readable storage medium of any of clauses 17 to 22, wherein the apparatus caused to automatically implement the one or more aggregate services, commands, and events includes the apparatus caused to build a natural-language interface to recognize and translate natural-language user input to one or more of the commands, the natural-language interface built according to a second language model trained to the semi-structured grammar of the DDD natural language.

Clause 24. The computer-readable storage medium of any of clauses 17 to 23, wherein the apparatus caused to deploy the software product includes the apparatus caused to at least: execute the software product; and using the software product, receive natural-language user input that conveys one or more of the commands; perform natural-language processing to recognize and translate the natural-language user input to the one or more of the commands, the natural-language processing performed according to a second language model trained to one or more parts of speech of lexical items used by the commands in the metamodel; and convert the one or more of the commands to corresponding programmatic application programming interface (API) commands from which at least one of the one or more aggregate services are invoked by the software product that is built to return responses to the one or more of the commands according to the second language model.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions can be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method of developing a software product in a no-code development platform (NCDP) to address a problem related to a business domain, the method comprising:
    designing and thereby producing a design of the software product in the NCDP, including:
        receiving design instructions describing software features to achieve a user experience design for the software product, the design instructions composed in a semi-structured grammar of a domain-driven design (DDD) natural language for the business domain; and
        generating a metamodel from the design instructions and according to the DDD natural language, the metamodel incorporating logic and data to implement the software features, the software product having an event sourcing architectural pattern in which the logic in the form of one or more aggregate services are invoked by commands, and the data in the form of events that describe changes in state of the software product are generated and published to an event store;
    automatically implementing the one or more aggregate services, commands, and events to build the software product from the metamodel, using an event sourcing framework as a programming model for the software product, and without requiring user coding of the software product; and
    deploying the software product for use to address the problem related to the business domain.

2. The method of claim 1, wherein the design instructions include first design instructions for the events, and receiving the design instructions comprises:

receiving natural-language user input that conveys at least some of the first design instructions;

performing natural-language processing to recognize and translate the natural-language user input to the first design instructions, the natural-language processing performed according to a first language model trained to the semi-structured grammar of the DDD natural language; and converting the first design instructions to the events.

3. The method of claim 1, wherein the software product is designed incrementally in which the design instructions include incremental design changes, and in which the metamodel is updated contemporaneous with the incremental design changes, and a context of the design instructions is retained for a flow of additional design instructions are also in the context.

4. The method of claim 3, wherein designing the software product further comprises maintaining a design log of the design instructions and the incremental design changes that enables traceability of the design of the software product as the software product is incrementally designed.

5. The method of claim 3, wherein designing the software product further comprises generating one or more visual artifacts of the design from the metamodel, and that drive at least some of the incremental design changes.

6. The method of claim 1, wherein the one or more aggregate services are automatically implemented as microservices.

7. The method of claim 1, wherein automatically implementing the one or more aggregate services, commands, and events includes building a natural-language interface to recognize and translate natural-language user input to one or more of the commands, the natural-language interface built according to a second language model trained to the semi-structured grammar of the DDD natural language.

8. The method of claim 1, wherein deploying the software product includes at least:

executing the software product; and using the software product, receiving natural-language user input that conveys one or more of the commands;

performing natural-language processing to recognize and translate the natural-language user input to the one or more of the commands, the natural-language processing performed according to a second language model trained to one or more parts of speech of lexical items used by the commands in the metamodel; and converting the one or more of the commands to corresponding programmatic application programming interface (API) commands from which at least one of the one or more aggregate services are invoked by the software product that is built to return responses to the one or more of the commands according to the second language model.

9. A computer-readable storage medium for developing a software product in a no-code development platform (NCDP) to address a problem related to a business domain, the computer-readable storage medium being non-transitory and having computer-readable program code stored therein that, in response to execution by processing circuitry, causes an apparatus to at least:

design and thereby produce a design of the software product in the NCDP, including the apparatus caused to:

receive design instructions describing software features to achieve a user experience design for the software product, the design instructions composed in a semi-structured grammar of a domain-driven design (DDD) natural language for the business domain; and generate a metamodel from the design instructions and according to the DDD natural language, the metamodel incorporating logic and data to implement the software features, the software product having an event sourcing architectural pattern in which the logic in the form of one or more aggregate services are invoked by commands, and the data in the form of events that describe changes in state of the software product are generated and published to an event store;

automatically implement the one or more aggregate services, commands, and events to build the software product from the metamodel, using an event sourcing framework as a programming model for the software product, and without requiring user coding of the software product; and deploy the software product for use to address the problem related to the business domain.

10. The computer-readable storage medium of claim 9, wherein the design instructions include first design instructions for the events, and the apparatus caused to receive the design instructions includes the apparatus caused to:

receive natural-language user input that conveys at least some of the first design instructions;

perform natural-language processing to recognize and translate the natural-language user input to the first design instructions, the natural-language processing performed according to a first language model trained to the semi-structured grammar of the DDD natural language; and convert the first design instructions to the events.

11. The computer-readable storage medium of claim 9, wherein the software product is designed incrementally in which the design instructions include incremental design changes, and in which the metamodel is updated contemporaneous with the incremental design changes, and a context of the design instructions is retained for a flow of additional design instructions are also in the context.

12. The computer-readable storage medium of claim 11, wherein the apparatus caused to design the software product further includes the apparatus caused to maintain a design log of the design instructions and the incremental design changes that enables traceability of the design of the software product as the software product is incrementally designed.

13. The computer-readable storage medium of claim 11, wherein the apparatus caused to design the software product further includes the apparatus caused to generate one or more visual artifacts of the design from the metamodel, and that drive at least some of the incremental design changes.

14. The computer-readable storage medium of claim 9, wherein the one or more aggregate services are automatically implemented as microservices.

15. The computer-readable storage medium of claim 9, wherein the apparatus caused to automatically implement the one or more aggregate services, commands, and events includes the apparatus caused to build a natural-language interface to recognize and translate natural-language user input to one or more of the commands, the natural-language interface built according to a second language model trained to the semi-structured grammar of the DDD natural language.

16. The computer-readable storage medium of claim 9, wherein the apparatus caused to deploy the software product includes the apparatus caused to at least:
execute the software product; and using the software product,
receive natural-language user input that conveys one or more of the commands;
perform natural-language processing to recognize and translate the natural-language user input to the one or more of the commands, the natural-language processing performed according to a second language model trained to one or more parts of speech of lexical items used by the commands in the metamodel; and
convert the one or more of the commands to corresponding programmatic application programming interface (API) commands from which at least one of the one or more aggregate services are invoked by the software product that is built to return responses to the one or more of the commands according to the second language model.

17. An apparatus for developing a software product in a no-code development platform (NCDP) to address a problem related to a business domain, the apparatus comprising:
a memory configured to store computer-readable program code; and
processing circuitry configured to access the memory, and execute the computer-readable program code to cause the apparatus to at least:
design and thereby produce a design of the software product in the NCDP, including the apparatus caused to:
receive design instructions describing software features to achieve a user experience design for the software product, the design instructions composed in a semi-structured grammar of a domain-driven design (DDD) natural language for the business domain; and
generate a metamodel from the design instructions and according to the DDD natural language, the metamodel incorporating logic and data to implement the software features, the software product having an event sourcing architectural pattern in which the logic in the form of one or more aggregate services are invoked by commands, and the data in the form of events that describe changes in state of the software product are generated and published to an event store;
automatically implement the one or more aggregate services, commands, and events to build the software product from the metamodel, using an event sourcing framework as a programming model for the software product, and without requiring user coding of the software product; and
deploy the software product for use to address the problem related to the business domain.

18. The apparatus of claim 17, wherein the design instructions include first design instructions for the events, and the apparatus caused to receive the design instructions includes the apparatus caused to:
receive natural-language user input that conveys at least some of the first design instructions;
perform natural-language processing to recognize and translate the natural-language user input to the first design instructions, the natural-language processing performed according to a first language model trained to the semi-structured grammar of the DDD natural language; and
convert the first design instructions to the events.

19. The apparatus of claim 17, wherein the software product is designed incrementally in which the design instructions include incremental design changes, and in which the metamodel is updated contemporaneous with the incremental design changes, and a context of the design instructions is retained for a flow of additional design instructions are also in the context.

20. The apparatus of claim 19, wherein the apparatus caused to design the software product further includes the apparatus caused to maintain a design log of the design instructions and the incremental design changes that enables traceability of the design of the software product as the software product is incrementally designed.

21. The apparatus of claim 19, wherein the apparatus caused to design the software product further includes the apparatus caused to generate one or more visual artifacts of the design from the metamodel, and that drive at least some of the incremental design changes.

22. The apparatus of claim 17, wherein the one or more aggregate services are automatically implemented as microservices.

23. The apparatus of claim 17, wherein the apparatus caused to automatically implement the one or more aggregate services, commands, and events includes the apparatus caused to build a natural-language interface to recognize and translate natural-language user input to one or more of the commands, the natural-language interface built according to a second language model trained to the semi-structured grammar of the DDD natural language.

24. The apparatus of claim 17, wherein the apparatus caused to deploy the software product includes the apparatus caused to at least:
execute the software product; and using the software product,
receive natural-language user input that conveys one or more of the commands;
perform natural-language processing to recognize and translate the natural-language user input to the one or more of the commands, the natural-language processing performed according to a second language model trained to one or more parts of speech of lexical items used by the commands in the metamodel; and
convert the one or more of the commands to corresponding programmatic application programming interface (API) commands from which at least one of the one or more aggregate services are invoked by the software product that is built to return responses to the one or more of the commands according to the second language model.

* * * * *